US007340527B2

(12) United States Patent
Tsusaka et al.

(10) Patent No.: US 7,340,527 B2
(45) Date of Patent: Mar. 4, 2008

(54) CONTENT DISTRIBUTION SYSTEM THAT DISTRIBUTES LINE OF STREAM DATA GENERATED BY SPLICING PLURALITY OF PIECES OF STREAM DATA

(75) Inventors: Yuko Tsusaka, Osaka (JP); Hirokazu Tokuda, Osaka (JP); Yoshiaki Iwata, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 769 days.

(21) Appl. No.: 10/396,417

(22) Filed: Mar. 26, 2003

(65) Prior Publication Data

US 2003/0212810 A1  Nov. 13, 2003

(30) Foreign Application Priority Data

May 9, 2002  (JP)  ............................. 2002-134645

(51) Int. Cl.
G06F 15/16  (2006.01)
G06K 9/36  (2006.01)
(52) U.S. Cl. ........................................ 709/231; 382/284
(58) Field of Classification Search ........ 709/201–253; 705/10, 14; 725/1–153; 707/1–10; 345/629–630; 352/91 R; 382/284; 715/726
See application file for complete search history.

(56) References Cited

U.S. PATENT DOCUMENTS

| 5,613,109 | A | 3/1997 | Yamauchi et al. |
| 6,029,045 | A * | 2/2000 | Picco et al. .................... 725/34 |
| 6,611,624 | B1 * | 8/2003 | Zhang et al. ................ 382/232 |
| 6,760,916 | B2 * | 7/2004 | Holtz et al. .................... 725/34 |
| 2002/0092019 | A1 * | 7/2002 | Marcus .......................... 725/37 |
| 2003/0167202 | A1 * | 9/2003 | Marks et al. .................. 705/14 |
| 2003/0206596 | A1 * | 11/2003 | Carver et al. ........... 375/240.26 |

OTHER PUBLICATIONS

Copending Application of Yuko Tsusaka et al., U.S. Appl. No. 10/050,098, filed Jan. 18, 2002, entitled "System and Method of Contents Distribution, and Contents Distribution Apparatus".

* cited by examiner

*Primary Examiner*—George C. Neurauter, Jr.
(74) *Attorney, Agent, or Firm*—Wenderoth, Lind & Ponack, L.L.P.

(57) ABSTRACT

A content distribution system according to the present invention accepts content request information from a user terminal, and detects and extracts pieces of stream data of programs and commercial messages based on a keyword contained in the content request information. When splicing an extracted piece of stream data of the program with an extracted piece of stream data of the commercial message, a transition effect is added to a splicing point therebetween. A line of stream data that is generated by splicing the pieces of stream data is distributed to the user terminal.

12 Claims, 10 Drawing Sheets

| INDEX INFORMATION | STREAM DATA |

| STREAM ID 301 | REPRODUCING TIME 302 | CM INSERTION ALLOWABLE TIME 303 | IMAGE TRANSITION 304 | SOUND TRANSITION 305 | RECORDING DATE 306 | KEYWORD 307 |
|---|---|---|---|---|---|---|
| 0001 | 00:30:00 | 00:12:30 | FADE-IN/OUT | FADE-IN/OUT | 2001/1/1 | BASEBALL, MAJOR |
| 0002 | 00:15:00 | 00:02:45 | FADE-IN/OUT | REVERB | 2001/1/2 | BASEBALL, MAJOR |
| 0003 | 00:25:00 | 00:08:30 | SWIRL | FADE-IN/OUT | 2001/2/2 | TENNIS |
| 0004 | 00:20:45 | 00:10:10 | WIPE-IN/OUT | SUSTAIN | 2001/2/4 | BASEBALL, MINOR |
| 0005 | 00:30:30 | 00:15:20 | RANDOM | RANDOM | 2001/3/12 | BASEBALL, MAJOR |
| ... | ... | ... | ... | ... | ... | ... |

FIG.5

| CM ID | KEYWORD | REPRODUCING TIME |
|---|---|---|
| CM01 | BASEBALL, BAT, PLAYER O, TEAM G | 00:00:30 |
| CM02 | SPORT, BASEBALL, SOCCER, TENNIS, DRINK | 00:00:30 |
| CM03 | SOCCER, BALL, PLAYER J, TEAM F | 00:00:30 |
| CM04 | SNACK, BASEBALL, PLAYER A, TEAM T | 00:00:30 |
| CM05 | SECURITY, MANAGER N, TEAM G, BASEBALL | 00:00:15 |
| ... | ... | ... |

FIG.6

| AMOUNT OF PAYMENT | NUMBER OF CM |
|---|---|
| 0YEN | 5 |
| 100YEN | 4 |
| 200YEN | 3 |
| 300YEN | 2 |
| 400YEN | 1 |
| 500YEN | 0 |

601

CONTENT DISTRIBUTION SYSTEM THAT DISTRIBUTES LINE OF STREAM DATA GENERATED BY SPLICING PLURALITY OF PIECES OF STREAM DATA

BACKGROUND OF THE INVENTION (1) Field of the Invention

The present invention relates to a content distribution system that accepts a user request via a network such as the Internet, splices a plurality of pieces of stream data into a line of stream data based on the user request, and distributes the line of stream data to the user terminal. More specifically, the present invention relates to a stream data splicing processing.

(2) Description of the Prior Art

In recent years, services for distributing users with multimedia contents (hereinafter referred to as contents) that include commercial messages (CMs) of sponsors of the contents at no extra charge have been offered. In order to meet users' higher demands in free distribution of the contents, much attention has been paid to the research and development of a content distribution system for arranging a content according to a user's request and distributing the content to the user.

According to conventional television and radio broadcasting, broadcasting service providers determine where to insert the CMs according to the program structure and plot development. The above described content distribution system employs a method for automatically determining a position where a CM is to be inserted in the program.

An example of methods to determine the position where th CM is to be inserted in the program is disclosed in Japanese Patent No. 3315928 as a method for inserting the CM. According to the method for inserting the CM of Japanese Patent No. 3315928, information indicating a position where the CM insertion is recommended is included in program data in advance, the CM is inserted into a CM insertion recommended position on a time-line of a reproducing time indicated by the information, and then the program and the CM are spliced. In the above manner, it is possible to insert the CM automatically into the program at an appropriate position.

Even when the CM is inserted according to the above method, however, it is still probable that an abrupt switching to the CM from the program makes the user watching and listening to the program feel unpleasant or surprised because the program and the CM are completely different.

SUMMARY OF THE INVENTION

An object of the present invention is to provide content distribution systems that are capable of distributing contents in which a program and a CM switches in a manner that a user watching and listening to a content does not feel unpleasant or surprised.

In order to achieve the above object, a content distribution system according to the present invention is a content distribution system comprising: a storing unit operable to store a plurality of pieces of stream data; an accepting unit operable to accept content request information from a user terminal; an extracting unit operable to extract more than one piece of stream data from the storing unit, according to the accepted content request information; a determining unit operable to determine whether or not to add a transition effect to a splicing point; a splicing unit operable to splice the pieces of extracted stream data into a line of a stream data, and to add the transition effect to the splicing point when a result of the determination is affirmative; and a distributing unit operable to distribute the generated line of stream data to the user terminal.

The transition effect refers to a special effect to achieve a smooth and natural transition of images or sound. Specific examples of the special effect for images include a fade-in/out effect, a wipe-in/out effect, and a dissolving effect. The transition from a scene A to a scene B using the fade-in/out effect is such that a luminance of the scene A gradually decreases until the scene A becomes all black, at which point the scene A switches to the scene B in all black at a lowest luminance of the scene B, and then the luminance of the scene B gradually increases to a normal level.

With the above construction, the transition effect is added to the splicing point when program data and CM data are spliced. Accordingly, transition from the program to the CM becomes smooth and natural, and it is possible to make the user feel less unpleasant or surprised.

A content distribution system according to the present invention may also be the above content distribution system, wherein the storing unit stores the pieces of stream data respectively in correspondence with pieces of attribute information which each indicate an attribute of the piece of stream data to which the attribute corresponds, and the determining unit determines that the transition effect is to be added to the splicing point only when one out of two pieces of stream data to be spliced has a specific attribute.

With the above system, the transition effect is added to the splicing point when only one of the two pieces of stream data that are spliced together has the CM attribute. Accordingly, transition from the program to the CM becomes smooth and natural, and it is possible to make the user feel less unpleasant or surprised.

A content distribution system according to the present invention may also be the above content distribution system further comprising a setting unit operable to set, based on payment information contained in the content request information from the user terminal, a number of pieces of stream data having the specific attribute and to be extracted from the storing unit. The specific attribute is a commercial message attribute indicating that a piece of stream data is a commercial message, and the payment information indicates an amount of payment that the user pays for a content.

With the above system, the number of CMs to be inserted in the program is set according to the amount of the payment that the user makes for the content. If the number of CMs is (0), the splicing point is not generated, and therefore, the transition effect is not added.

A content distribution system according to the present invention may also be the above content distribution system, wherein the storing unit stores identifying information for identifying a type of the transition effect in correspondence with each of the pieces of stream data excluding the pieces of stream data having the commercial message attribute. Further, the splicing unit adds, when the determining unit determines that a transition effect is to be added to a splicing point, the transition effect of the type indicated by the identifying information corresponding to another of the two pieces of the extracted stream data that does not have the commercial message attribute.

A content distribution system according to the present invention may also be the above content distribution system further comprising a personal information storing unit operable to store personal information of the user, and a selecting unit operable to select the type of the transition effect to be added, according to the personal information. The splicing unit adds the selected transition effect to the splicing point when the determining unit determines that the transition effect is to be added to the splicing point.

A content distribution system according to the present invention may also be the above content distribution system, wherein the storing unit stores position information indicating a position where insertion of the commercial message is allowed on a reproducing time-line of the piece of stream data without the commercial message attribute. The splicing unit inserts the piece of stream data having the commercial message attribute into the piece of stream data without the commercial message attribute at the position indicated by the position information in the piece of stream data without the commercial message attribute by priority, and splices the piece of stream data having the commercial message attribute and the piece of stream data without the commercial message attribute.

A content distribution system according to the present invention may also be the above content distribution system further comprising a detecting unit operable to detect, based on keyword information, the piece of stream data associated with a stream data keyword stored in the storing unit. The keyword information indicates a user keyword associated with the content requested by the user and is contained in the content request information from the user terminal. Further, the extracting unit extracts the piece of stream data detected by the detecting unit from the storing unit.

BRIEF DESCRIPTION OF THE DRAWINGS

These and the other objects, advantages and features of the invention will become apparent from the following description thereof when taken in conjunction with the accompanying drawings which illustrate a specific embodiment of the invention.

In the drawings:

FIG. 2 shows a construction of stream data and index information;

FIG. 3 is a table of an example of specifics shown in the index information of a program data;

FIG. 5 shows a data structure of pieces of data stored in a CM data storing unit;

FIG. 6 is a table of an example of specifics shown in the index information of CM data;

DETAILED DESCRIPTION OF THE PREFERRED EMBODIMENT

The following describes a content distribution system that distributes a line of stream data which is generated by splicing a plurality of pieces of stream data according to a preferred embodiment of the present invention, with reference to the drawings.

Construction

Figure 1:
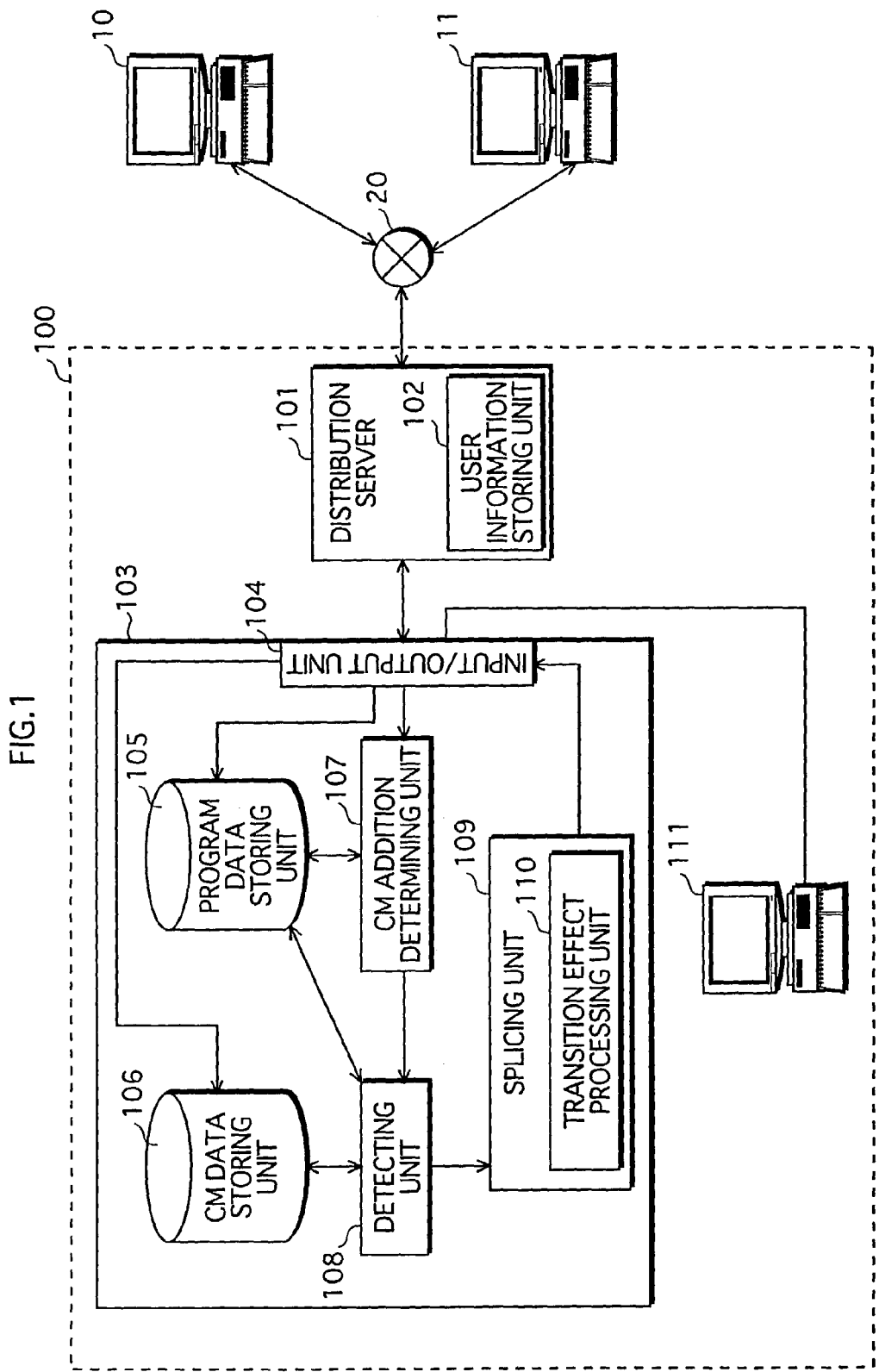
FIG. 1 shows a functional structure of a content distribution system.

FIG. 1 shows a functional structure of a content distribution system 100.

The content distributing system 100 has a two-way communication with user terminals 10 and 11 via a network 20. Note that, although only two user terminals are shown in FIG. 1, the content distributing system according to the present invention is prepared for several thousands to several ten thousands of user terminals.

The user terminals 10 and 11 each include a communicating function, a content reproducing function, and a user interface function. Examples of the user terminal include a personal computer and a portable terminal.

The content distribution system 100 accepts content request information transmitted from each user terminal, automatically arranges a content according to the content request information, and distributes the arranged content to the user terminal that has transmitted the content request information.

The content here refers to the line of stream data such as movies and music, and includes a sponsor CM (commercial message) in addition to the program that the user requests. The number of CMs included in the content varies according to an amount of payment that the user makes for the content. A content provider provides the user with a price table showing a price for the content according to the number of the CMs. The user determines the amount of the payment based on the price in the price table.

The content distribution system 100 comprises a distribution server 101, a user information storing unit 102, a content producing apparatus 103, and an operator terminal 111.

The distribution server 101 is made of a plurality of computers so that the server can deal with a massive amount of simultaneous access thereto. The distribution server 101 includes a function for accepting various information, such as the content request information transmitted from each of the user terminals, a function for transmitting information which is necessary to arrange the content to the content producing apparatus 103 and then for storing the content produced by the content producing apparatus 103, and a function for streaming distribution of the stored content to the user terminal based on streaming control information in compliance with RTSP (Real-Time Streaming Protocol).

The user information storing unit 102 stores a database of personal information such as an ID, a password, a name, an age, a gender, a mailing address, and a credit card number for settlement. The personal information is used for an authentication upon an access from the user terminal and for the settlement of the payment for the content.

The content producing apparatus 103 is a computer made of a CPU, an input/output unit, a memory, a hard disk, and the like. The content producing apparatus 103 functionally comprises an input/output unit 104, a program data storing unit 105, a CM data storing unit 106, a CM addition determining unit 107, a detecting unit 108, and a splicing unit 109.

The input/output unit 104 has a function for inputting and outputting various kinds of data.

The program data storing unit 105 is a high-capacity storage medium such as a hard disk, and stores a database of a plurality of program data in addition to index information. The program data and the index information are input into the program data storing unit 105 by an operator operating the operator terminal 111.

The CM data storing unit 106 is, as with the program data storing unit 105, a high-capacity storage medium such as a hard disk, and stores a database of a plurality of CM data in addition to index information. The CM data and the index information are input into the CM data storing unit 106 in the same manner as with a case of the program data.

The CM addition determining unit 107 has a function for determining whether or not to add a CM to the content to be distributed based on payment information contained in the content request information, and, when the CM is to be added, for setting a number of the CMs to be added to the content.

The detecting unit 108 has a function for running a keyword search for relevant program data from among the program data stored in the program data storing unit 105 and for relevant CM data from among the CM data stored in the CM data storing unit 106. The detecting unit 108 extracts the relevant program data and CM data from each of the storing units 105 and 106, and transmits the retrieved (extracted) pieces of stream data to the splicing unit 109.

The splicing unit 109 has a function for splicing the pieces of stream data extracted by the detecting unit 108, and includes a transition effect processing unit 110. The index information of the program data and the CM data contain a stream ID and a CMID, respectively. The splicing unit 109 splices the pieces of stream data based on the index information of each of the pieces of stream data. For example, the CMID also indicates that the piece of stream data is the CM, and the splicing unit 109 determines to add a transition effect to the splicing point when only one of two pieces of stream data at the splicing point is the CM by referring to the index information.

On the other hand, the transition effect is not added to the splicing point between two program data or two CM data.

A type of the transition effect to be added is determined based on identifying information for identifying the types of transition effects indicated in fields for an image transition and a sound transition in the index information of the program data.

The operator terminal 111 is a terminal which is utilized for writing the program data, the CM data, and the index information in each storing unit in the content producing apparatus 103, and is connected to the content producing apparatus 103 via a LAN connection. The operator terminal 111 loads the program data and the CM data via a CD-ROM drive, a DVD-ROM drive, a USB port, or a LAN port provided thereto.

Data

Next, an explanation on various kinds of information that are handled by the content distribution system 100 according to the present invention is given.

Figure 2:
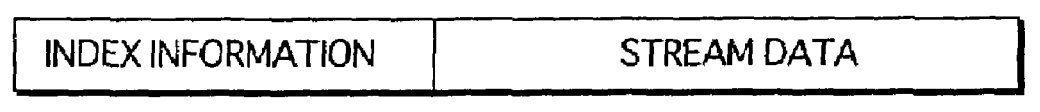

FIG. 2 shows a plurality of the index information and the pieces of stream data that are stored in each storing unit in the content producing apparatus 103. The pieces of stream data are either the program data or the CM data and correspond to the index information as shown in FIG. 2.

Program Data Index Information

FIG. 3 illustrates an example of specifics shown in the index information of the program data. The index information of the program data contains a stream ID 301, a length of reproducing time 302, a CM insertion allowable time 303, an image transition 304, a sound transition 305, a recording data 306, a keyword 307, and such. The index information of the program data is generated by the operator using the operator terminal 111.

The stream data ID 301 is a unique number assigned to the program data in an order that the program data is written in the program data storing unit 105.

The length of reproducing time 302 indicates how long it takes to complete reproduction of the program data, and is shown in a form of "hour:minute:second".

The CM insertion allowable time 303 is a time position on a reproducing time-line of the program data, to which the operator, after watching and listening to the program data, determines that the CM may be inserted. The CM insertion allowable time 303 is shown in the form of "hour:minute:second". An example of the position to which the CM can be inserted is a scene where the offense and defense are switching in a baseball game. In a case in which the CM is inserted to the time position indicated by the CM insertion allowable time 303, the splicing unit 109 splits the program data in two at a data position corresponding to the time position, and splices the CM data between the split program data.

The image transition 304 indicates the identifying information for an image transition effect to be added to the splicing point between the program data and the CM data when the program data and the CM data are spliced. Examples of the image transition effect for the image include a fade-in/out effect and a wipe-in/out effect.

The sound transition 305 indicates the identifying information for a sound transition effect to be added to the splicing point between the program data and the CM data when the program data and the CM data are spliced. Examples of the sound transition effect for the image include a fade-in/out effect and a sustain effect.

The recording data 306 indicates a data on which the program data is stored in the program data storing unit 105, and is shown in the form of "year/month/day". In a case in which the detecting unit 108 detects more than one detected program data, the splicing unit 109 splices the more than one program data in an order in which the program data are stored.

The keyword 307 is the keyword associated with the program data.

Specifics of generating the index information of the program data by the operator are explained below. First, the operator starts an application software which is exclusively designed for generating the index information of the program data and which is installed in the operator terminal 111, and imports the program data into the operator terminal 111.

Figure 4:
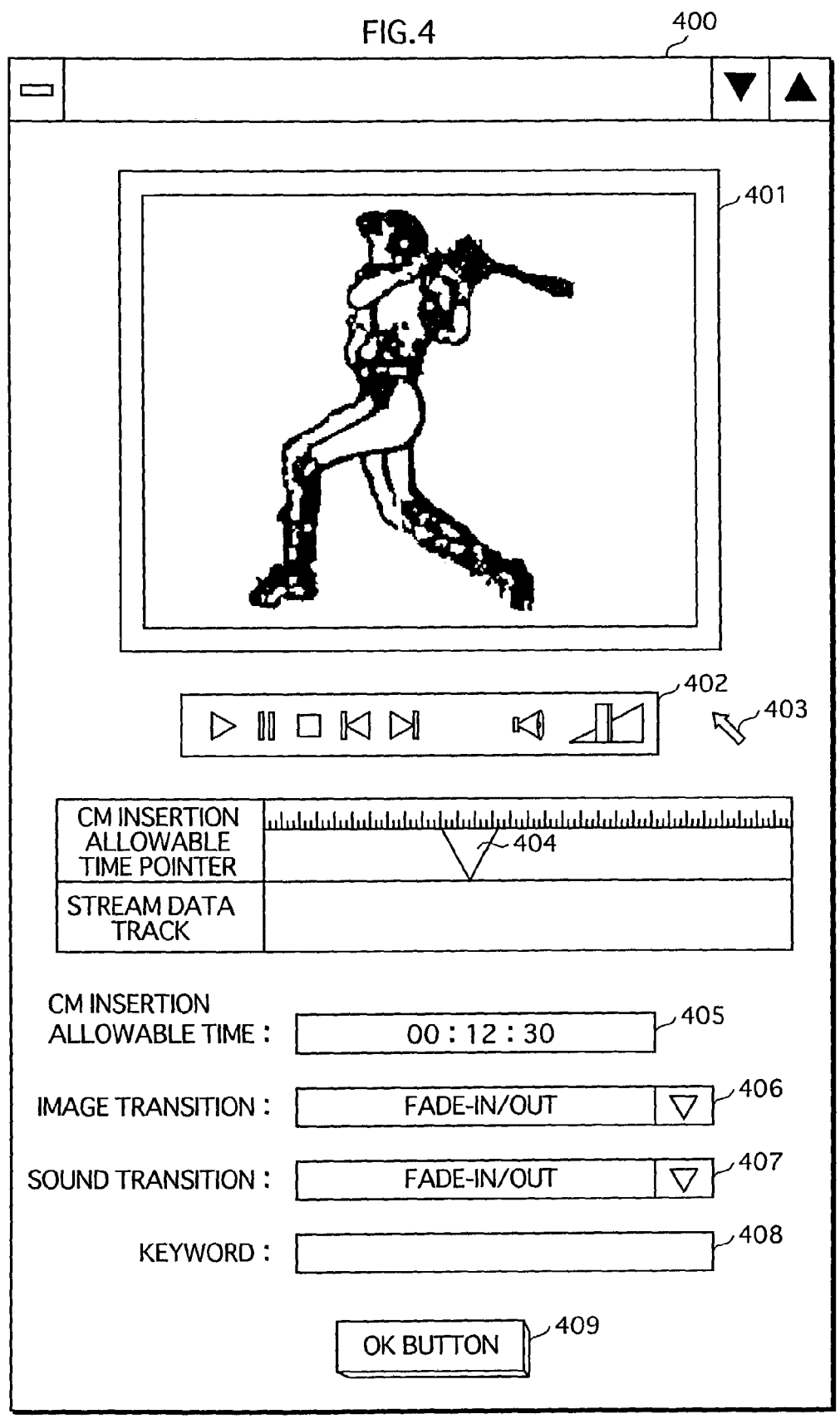
FIG. 4 illustrates a GUI window on a display of an operator terminal.

FIG. 4 shows a GUI (Graphical User Interface) window 400 in which the operator performs operations for generating the index information of the program data that is imported into the operator terminal 111.

The GUI window 400 comprises an image display area 401, program data operating buttons 402, a mouse pointer 403, a CM insertion allowable time pointer 404, a CM insertion allowable time field 405, an image transition selection field 406, a sound transition selection field 407, a keyword input field 408, and an OK button 409.

The image display area 401 shows a picture frame at the position of the data track that is indicated by the CM insertion allowable time pointer 404.

The program data operating buttons 402 are a group of buttons indicating functions such as replay, pause, stop, backward, forward, and volume control.

The mouse pointer 403 is a pointer that moves in conjunction with the mouse.

The CM insertion allowable time pointer 404 moves right and left in conjunction with the pressing of right and left arrow keys provided to the keyboard, and indicates the reproducing time position on the program data track showing the time-line of the program data. The operator specifies the time position where the CM insertion is allowed by operating the CM insertion allowable time pointer 404.

The CM insertion allowable time field 405 is a field where the operator inputs the CM insertion allowable time. When the time is not input, the reproducing time position of the program data track indicated by the CM insertion allowable time pointer 404 is indicated. When the time is input, the picture frame at the reproducing time input in the field is displayed.

The image transition selection field 406 is a field in which the operator selects the image transition effect. A list of selectable types of the transition effect is shown when an upside-down triangle button is pressed, and the operator selects one of the transition effects from the list.

The sound transition selection field 407 is a field in which the operator selects the sound transition effect. As with a case of the image transition selection field 406, a list of selectable types of the transition effect is shown when an upside-down triangle button is pressed, and the operator selects one of the transition effects from the list.

The keyword input field 408 is a field in which the keyword associated with the program data is input. It is possible that the operator inputs more than one keyword.

The OK button 409 is a button to determine whether to save information that has been input in the fields described above as the index information. Upon pressing the OK button 409, the imported program data and the index information are stored in the program data storing unit 105 and are corresponded to each other.

CM Data Index Information

Next, an explanation on CM data index information is given. FIG. 5 illustrates an example of specifics shown in the index information of the CM data. The index information of the CM data contains the CMID 501, a length of reproducing time 503, a keyword 502, and such, and is generated by the operator using the operator terminal 111.

The CMID 501 is a unique number assigned to the CM data in an order that the CM data is written in the CM data storing unit 106, and is used as attribute information because it contains text information of "CM" to indicate that the data is the CM data.

The keyword 502 is the keyword requested by a CM sponsor. For example, if the CM data is of the CM for an isotonic drink, keywords such as sport, baseball, football, and tennis are input so as to be associated with the program data related to sports.

The length of reproducing time 503 indicates how long it takes to complete reproduction of the CM data, and is shown in a form of "hour:minute:second"

Price Table

Next, an explanation on the table of the content price is given with reference to FIG. 6. According to the price table 601, 5 CMs are to be added when the user does not pay for the content, and as the amount of the payment increases by 100 yen. the number of CMs to be added decreases by one; with the payment of 500 yen by the user, there is no CM to be added.

Content Request Information

Next, an explanation on the content request information which is transmitted to the distribution server 101 from the user terminal is given.

Figure 7:
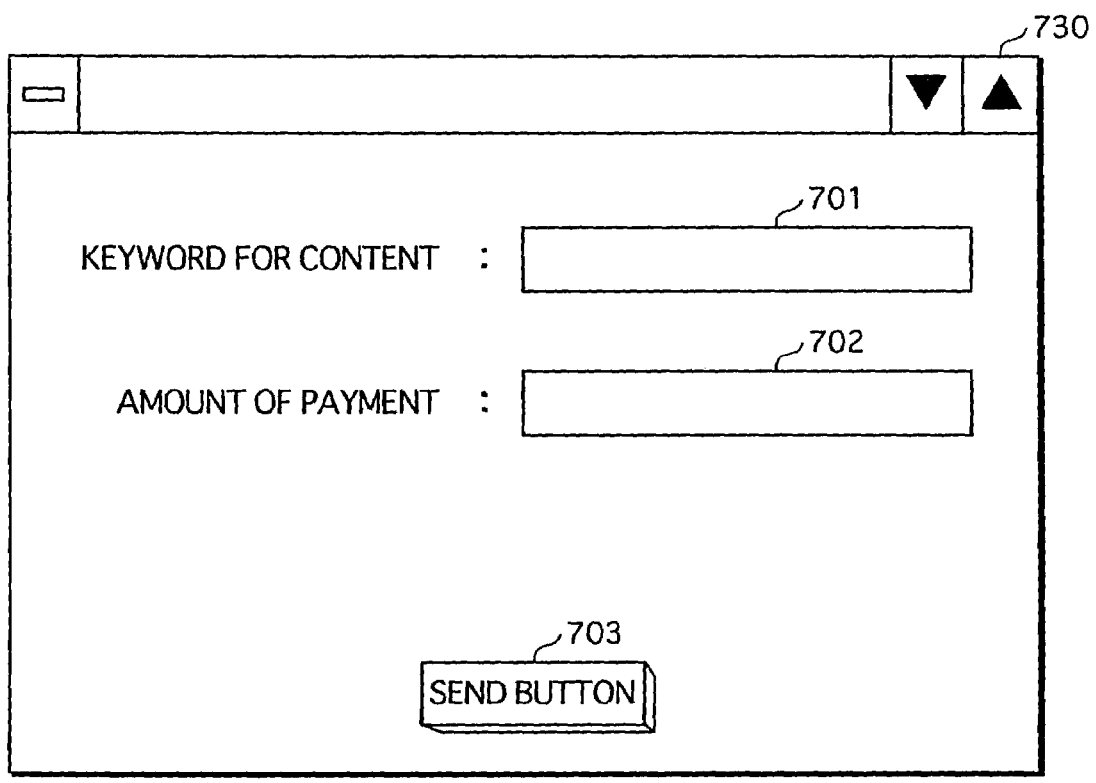
FIG. 7 illustrates a GUI window on a display of a user terminal.

When the user requests the distribution system 100 for the content, the user first starts an application software which is exclusively designed for requesting the content and which is installed in the user terminal. FIG. 7 shows a GUI (Graphical User Interface) window 730 that is displayed at the user terminal when the application software is launched.

The GUI window 730 comprises a content keyword input field 701, a payment input field 702, and a send button 703.

The content keyword input field 701 is a field in which the user inputs the keyword associated with the content. It is possible that the user inputs more than one keyword by typing a space between the keywords.

The payment input field 702 is a field in which the user inputs the amount of the payment that the user wants to make for the content. The content provider provides the user with the price table as shown in FIG. 6 in advance, and the user decides the amount of the payment by referring to the price table.

The send button 703 is a button to determine whether information that has been input in the content keyword input field 701 and the payment input field 702 are to be included in the content request information and transmitted.

Figure 8:
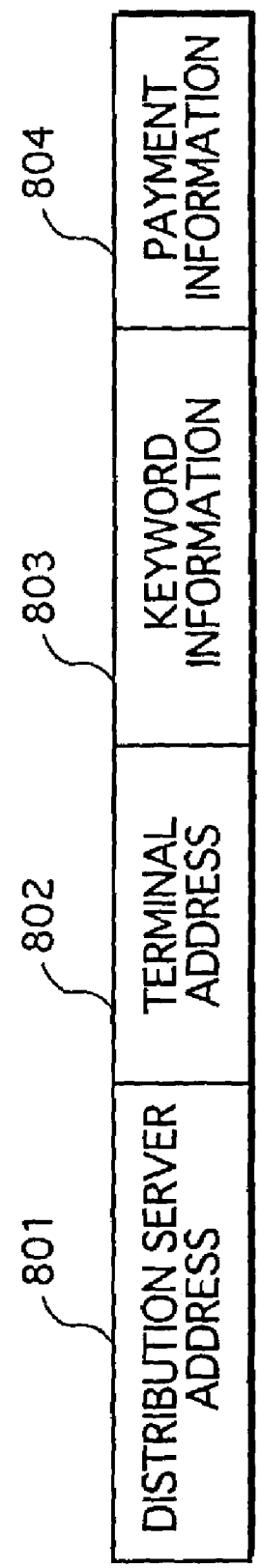
FIG. 8 shows various information included in content request information.

Next, an explanation on a structure of information contained in the content request information is given. FIG. 8 shows the structure of information contained in the content request information.

A distribution server address 801 indicates an IP address of the distribution server to which the content request information is transmitted.

A terminal address 802 indicates an IP address of the user terminal from which the content request information is transmitted.

Keyword information 803 indicates the keyword that the user inputs.

Payment information 804 indicates the amount of the payment that the user inputs.

Operation

Figure 9:
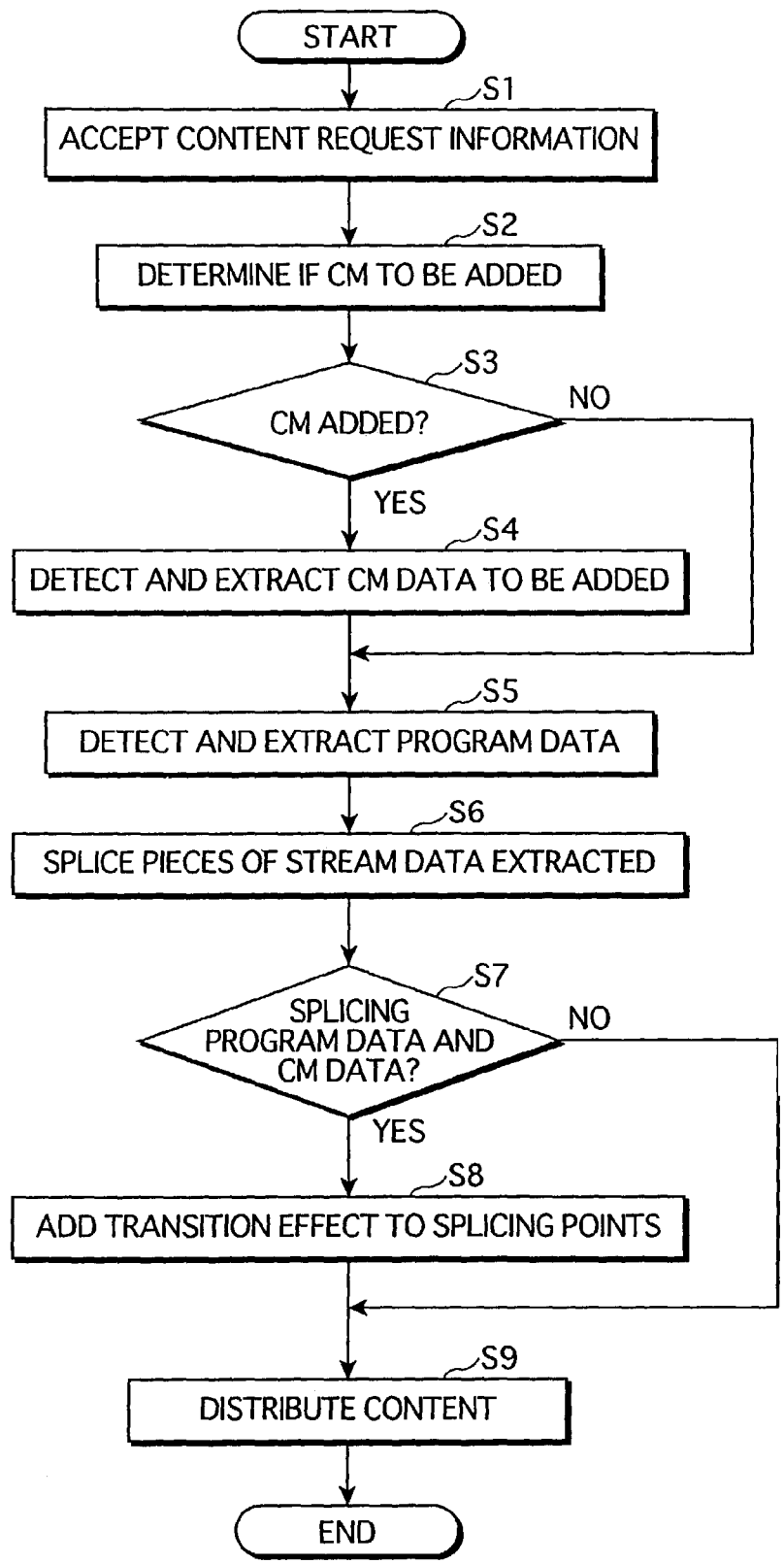
FIG. 9 is a flow chart showing an operation of the content distribution system.

Next, an explanation on an operation of the content distribution system 100 is given. FIG. 9 is a flow chart illustrating a process performed in the content distribution system 100.

First, the distribution server 101 accepts the content request information transmitted from the user terminal (Step S1). The keyword information and the payment information contained in the accepted content request information are transmitted to the content producing apparatus 103.

The CM addition determining unit 107 in the content producing apparatus 103 determines, based on the transmitted payment information, whether or not to add the CM to the content and sets the number of CMs to be added (Step S2).

When the result of the determination is to add the CM to the content (Step S3:YES), the detecting unit 108 detects the CM data from the CM data storing unit 106 based on the keyword information, and extracts the number of CMs that are set (Step S4). Then, the operation moves to Step S5.

When the result of the determination is not to add the CM to the content (Step S3:NO), the operation moves to Step S5.

In Step S5, the detecting unit 108 detects and extracts the program data from the program data storing unit 105 based on the keyword information. Pieces of stream data are spliced together by the splicing unit 109 (Step S6).

In splicing pieces of stream data, when the program data and the CM data are spliced (Step S7:YES), the transition effect processing unit 110 adds the transition effect to the splicing point therebetween (Step S8). If the pieces of spliced stream data are both program data or both CM data (Step S7:NO), the transition effect processing unit 110 does not add the transition effect to the splicing point therebetween. A line of stream data generated by splicing the pieces of stream data is output to the distributed server 101.

The distribution server 101 stores the content that is output from the content producing apparatus 103, and transmits the content to the user terminal that has transmitted the content request information (Step S9).

Figure 10:
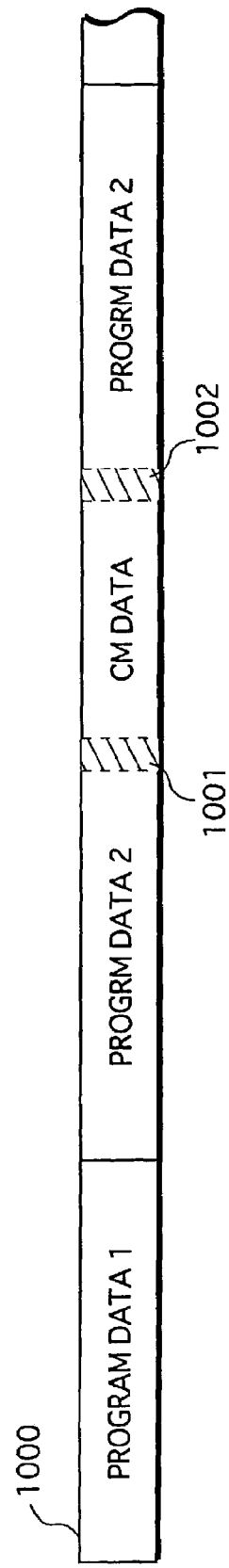
FIG. 10 is a diagram schematically illustrating a content in which a transition effect is added to a splicing point between the program data and the CM data.

FIG. 10 schematically shows an example of a content that is output from the content producing apparatus 103. A content 1000 includes program data 1, program data 2, CM data, and the like. The CM data is inserted into the program data 2 at a data position indicated by the CM insertion allowable time in the index information of the program data 2, and spliced at the data position. Transition effects 1001 and 1002 are added to stress around the splicing points between the program data 2 and the CM data.

The transition effects 1001 and 1002 are of the type of transition effect indicated by the identifying information described in the image transition and the sound transition fields in the index information of the program data 2.

Modified Examples

The present invention is not restricted to the above embodiment, and the following modified examples are also possible.

(1) While the content distribution system in the above embodiment includes the content producing apparatus 103, the distribution server 101, and the operator terminal 111, each having specific functional units as has been detailed in the embodiment, any one of apparatuses in a system may include any of the functional units explained in the above embodiment. For example, the detecting unit 108 may be included in the distribution server 101. It is also possible to construct the content distribution system according to the present invention by only one apparatus.

(2) In the above embodiment, the transition effect to be added is selected based on the identifying information described in the image transition and the sound transition fields in the index information. The present invention is not restricted to the above embodiment, however, and the transition effect to be added may be selected based on the personal information stored in the user information storing unit 102. For example, a swirl effect is selected if the user is younger than 20 years old, and a wipe-in/out effect is selected if the user is 20 years old or older.

Further, it is also possible to accept a user selection for the type of the transition effect, and to add the transition effect selected by the user.

(3) Although only one CM insertion allowable time is set per program data in the above embodiment, more than one CM insertion allowable time may be set per program data in the content distribution system according to the present invention. Further, the image and sound transitions for one CM insertion allowable time may be different from the image and sound transitions for another CM insertion allowable time in the same program data.

(4) In the above embodiment, the CM data are detected and extracted based on the keyword transmitted from the user terminal. The present invention is not limited to the above embodiment, however, and it is also possible that the CM data are detected and extracted based on the personal information stored in the user information storing unit 102. Further, the primary CM data may be added to the content based on the selection of the content provider.

(5) The present invention may also be a content distribution method that includes steps of a procedure carried out in the content distribution system described in the above embodiment (a sequence illustrated in FIG. 9, for example).

In addition, the present invention may also be a computer program for realizing the content distribution method by a computer, and digital signals comprising the computer program.

(6) The present invention may also be embodied by the computer programs or the digital signals that are recorded in a computer readable storage medium such as a flexible disk, a hard disk, CM-ROM, MO, DVD, DVD-ROM, DVD-RAM, BD (Blue-ray Disc), and a semiconductor memory.

(7) The present invention may also be embodied by the computer programs or the digital signals that are transmitted via a telecommunication line, a wireless connection, a cable communication line, and the network represented by the Internet, and the like.

Although the present invention has been fully described by way of examples by referring to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A content distribution system comprising:
a storing unit operable to store a plurality of pieces of stream data and a plurality of pieces of attribute information respectively corresponding to any one of the pieces of stream data;
an accepting unit operable to accept request information for requesting a content from a terminal;
an extracting unit operable to extract more than two pieces of stream data from said storing unit, according to the accepted request information;
a determining unit operable to determine to add a transition effect to a splicing point of two pieces of the stream data included in the more than two pieces of stream data extracted by said extracting unit when only one of two pieces of attribute information corresponding to the two pieces of stream data of the splicing point has a specific attribute, by referring to the two pieces of attribute information corresponding to the two pieces of stream data of the splicing point;
a splicing unit operable to splice the pieces of the stream data extracted by said extracting unit into a line of stream data, and to add the transition effect to the splicing point when said determining unit determines to add the transition effect to the splicing point; and
a distributing unit operable to distribute the line of the stream data spliced by said splicing unit to the terminal.

2. A content distribution system according to claim 1, wherein the specific attribute is a commercial message attribute indicating that a piece of the stream data is a commercial message.

3. A content distribution system according to claim 2, further comprising:
a setting unit operable to set, based on payment information contained in the request information, a number of pieces of stream data with the commercial message to be extracted from said storing unit, wherein:
the payment information indicates an amount of payment that a user pays for a content; and
said extracting unit is operable to extract the number of pieces of the stream data set by setting unit.

4. A content distribution system according to claim 3, wherein:
said storing unit is operable to store identifying information for identifying a type of the transition effect corresponding to each of the pieces of stream data excluding the pieces of stream data with the commercial message attribute; and said splicing unit is operable to add the transition effect to the splicing point of the two pieces of stream data extracted by said extracting unit based on the type indicated by the identifying information corresponding to another of the two pieces of the extracted stream data, the other of the two pieces of stream data being without the commercial message.

5. A content distribution system according to claim 4, further comprising:

a personal information storing unit operable to store personal information of the user; and a selecting unit operable to select the type of the transition effect to be added, according to the personal information, wherein said splicing unit is operable to add the selected transition effect to the splicing point when said determining unit determines to add the transition effect to the splicing point.

6. A content distribution system according to claim 5, further comprising a detecting unit operable to detect a piece of stream data from said storing unit, wherein:

the detected piece of the stream data is a piece of stream data whose corresponding piece of attribute information includes a keyword associated with the keyword information included in the request information which is input by a user; and said extracting unit is operable to extract the piece of stream data detected by said detecting unit from said storing unit.

7. A content distribution system according to claim 3, further comprising a storing unit operable to store position information indicating a position where insertion of the commercial message is allowed on a reproducing time axis of the piece of stream data without the commercial message, wherein said splicing unit is operable to insert the piece of stream data with the commercial message into the stream data without the commercial message at the position indicated by the position information in the stream data without the commercial message by priority, and splice the piece of stream data with the commercial message and the piece of stream data without the commercial message.

8. A content distribution system according to claim 3, wherein said splicing unit is operable to automatically add the transition effect to the splicing point when said determining unit determines to add the transition effect to the splicing point.

9. A distribution method that causes a computer to distribute a content, said method comprising:

storing a plurality of pieces of stream data and a plurality of pieces of attribute information respectively corresponding to any one of the pieces of stream data;

accepting request information for requesting a content from a terminal;

extracting more than two pieces of stream data stored in said storing of the plurality of pieces of stream data and the plurality of pieces of attribute information, according to the accepted request information;

determining to add a transition effect to a splicing point of two pieces of the stream data included in the more than two pieces of stream data extracted by said extracting of the more than two pieces of stream data when only one of two pieces of attribute information corresponding to the two pieces of stream data of the splicing point has a specific attribute, by referring to the two pieces of attribute information corresponding to the two pieces of stream data of the splicing point;

splicing the pieces of the extracted stream data into a line of stream data, and adding the transition effect to the splicing point when said determining determines to add the transition effect to the splicing point; and distributing the line of stream data to the terminal.

10. A distribution method according to claim 9, wherein said splicing comprises automatically adding the transition effect to the splicing point when said determining determines to add the transition effect to the splicing point.

11. A computer program stored on a computer-readable recording medium and having plural instructions to be executed by a computer, said plural instructions causing the computer to perform operations comprising:

storing a plurality of pieces of stream data and a plurality of pieces of attribute information respectively corresponding to any one of the pieces of stream data;

accepting request information for requesting a content from a terminal;

extracting more than two pieces of stream data among the plurality of stored pieces of stream data, according to the accepted request information;

determining to add a transition effect to a splicing point of two pieces of the stream data included in the more than two pieces of stream data extracted by said extracting of the more than two pieces of stream data when only one of two pieces of attribute information corresponding to the two pieces of stream data of the splicing point has a specific attribute by referring to the two pieces of attribute information corresponding to the two pieces of stream data of the splicing point;

splicing the pieces of the extracted stream data into a line of stream data, and, adding the transition effect to the splicing point when said determining determines to add the transition effect to the splicing point; and distributing the line of stream data to the terminal.

12. A distribution method according to claim 11, wherein said splicing comprises automatically adding the transition effect to the splicing point when said determining determines to add the transition effect to the splicing point.

* * * * *